Patented Aug. 28, 1951

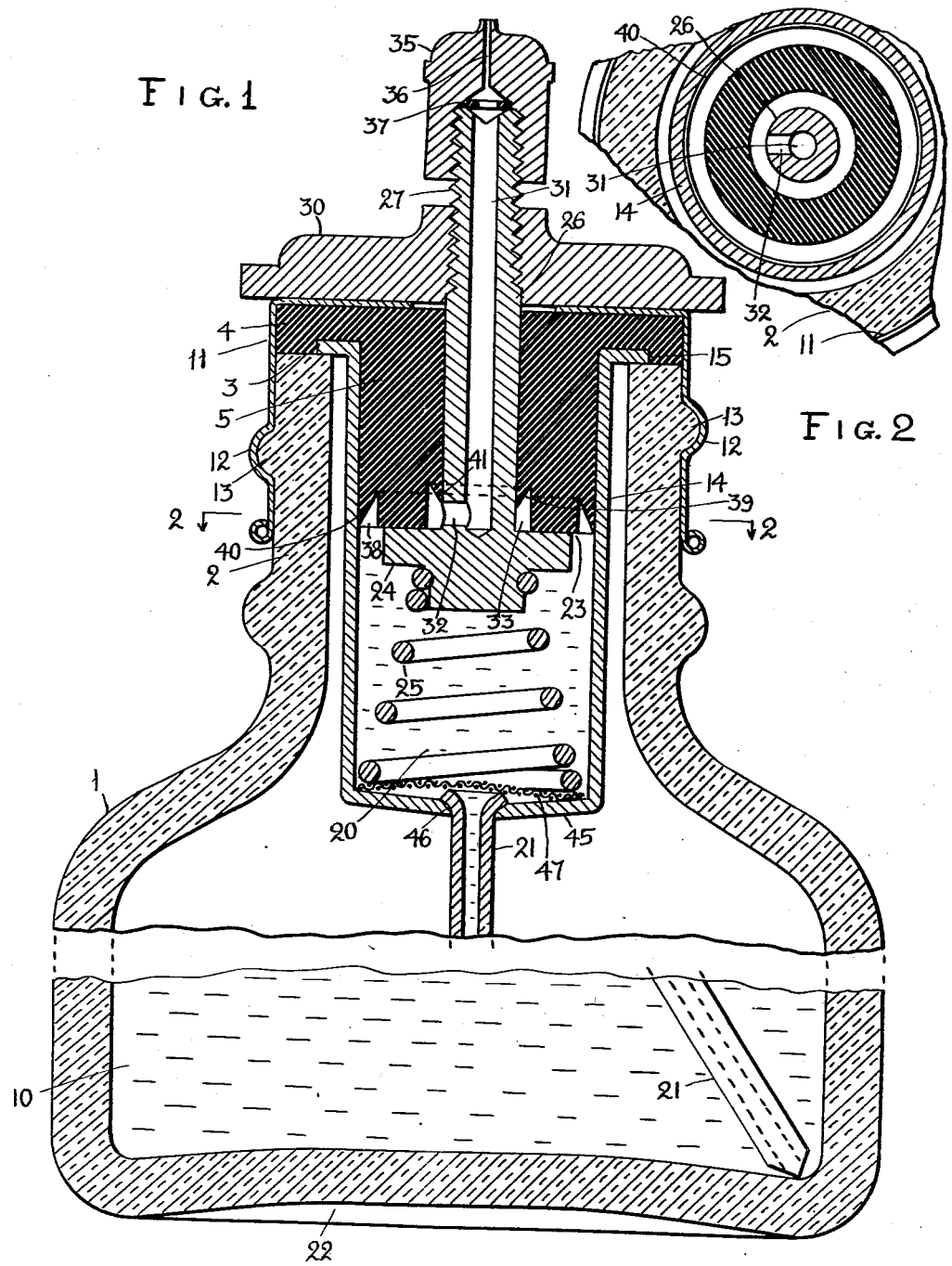

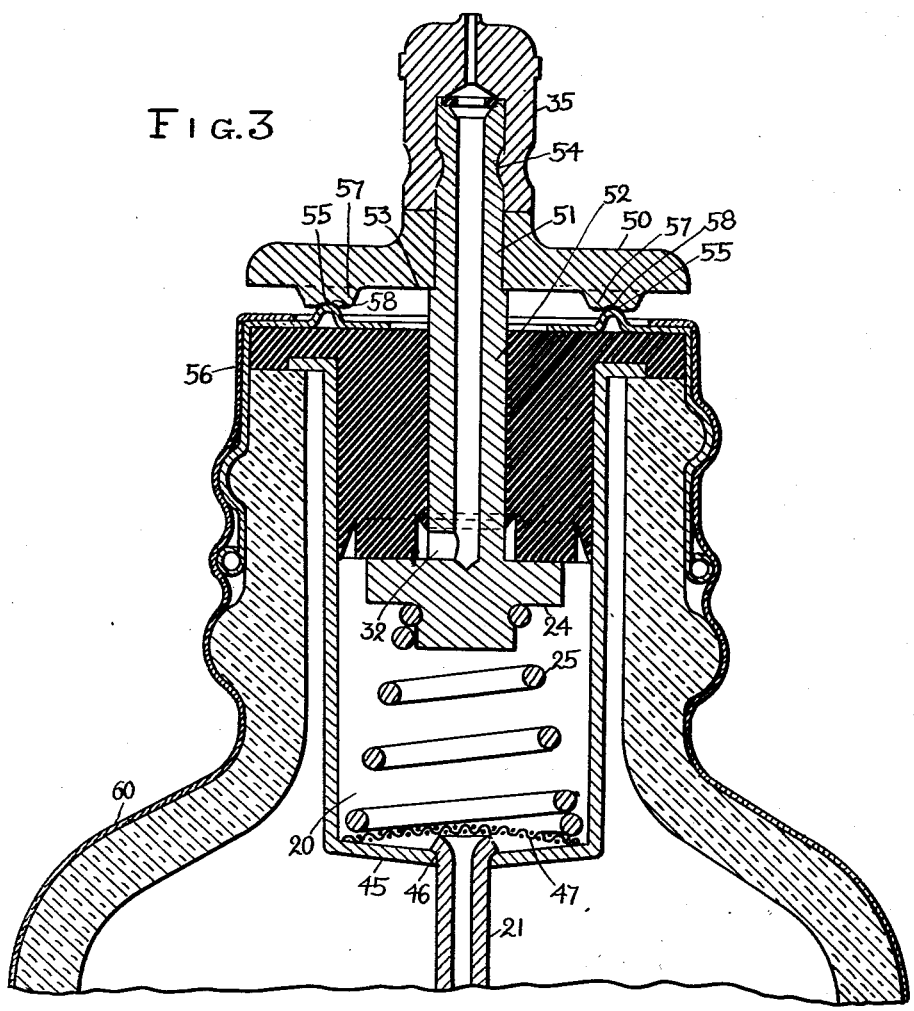
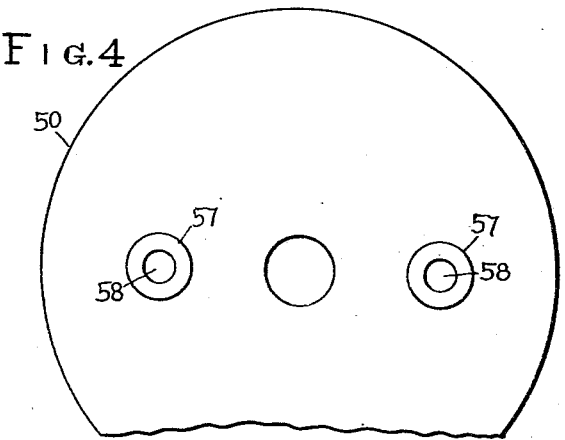
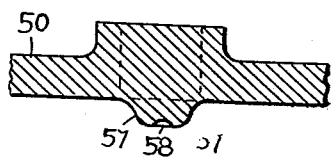
INVENTOR.
ANTHONY R. DEY
BY
ATTORNEY

2,565,954

UNITED STATES PATENT OFFICE 2,565,954

VALVED CLOSURE FOR VESSEL WITH FLUID UNDER PRESSURE, HAVING MANUALLY OPERATED VALVE ACTUATOR

Anthony R. Dey, New Haven, Conn., assignor to Gaspray Corp., New York, N. Y., a corporation of New York Application February 23, 1946, Serial No. 649,474

8 Claims. (Cl. 222—394)

My invention relates to valves and has particular reference to manually operable valves for vessels or containers adapted to hold fluids under pressure.

My invention has for its object to provide a valve of the foregoing general description which can effectively seal the vessel against any possible leakage and at all pressures for which the vessel is designed.

Another object of my invention is to provide a valve which can be locked in a closed position by a manipulator and easily unlocked for allowing a manual opening thereof to a desired degree.

Another object of my invention is to provide a valve which can be used with a vessel containing a liquid under pressure and which is effectively sealed for preventing the liquid and gases in the vessel from escaping.

Another object of my invention is to provide an enclosure for the valve which will be at all times filled with the liquid until the last drop remains in the vessel, excluding the gases therefrom.

Still another object of my invention is to provide novel means to support a pipe for the liquid extending from the bottom of the vessel into the casing of the valve.

The foregoing and other objects, features and advantages are more fully described in the following specification and drawing in which:

Fig. 1 represents a fragmentary sectional elevational view of my valve fitted in a container, drawn on an enlarged scale;

Fig. 2 is a fragmentary sectional view taken on the line 2—2 of Fig. 1;

Fig. 3 is a fragmentary elevational view of a modified valve;

Fig. 4 is a bottom plan view of the manipulator;

Fig. 5 is a sectional developed view of the modified manipulator.

My valve is shown, by way of an example, mounted in a container 1, which may be made of glass or similar material sufficiently strong to resist a high internal pressure. The container has a neck 2 of a generally cylindrical shape with a flat upper edge portion 3 which is engaged by the flange 4 of a valve block 5. The block 5 is preferably made of a resilient material, such as rubber, natural or synthetic, impervious to a liquid 10 placed in the container. The block is held in place by a cap 11 preferably made of sheet metal and provided with an internal thread 12 engaging a spiral rib 13 on the neck. The cap can be screwed, therefore, on the neck, tightly holding the flange 4 to the neck of the container. A valve casing 14, preferably made of metal or plastic composition, is held by its flange 15 under the flange 4 of the block 5 and extends below the lower portion of the block 5, forming a closed chamber 20. A liquid supply pipe 21 extends from the casing 14 to the bottom 22 of the container for feeding the liquid into the valve casing from the bottom of the container. With this arrangement the casing is always filled with the liquid, up to the moment when the last drops of the liquid are forced from the bottom of the container through the pipe 21. With the exception of the pipe 21, the casing 14 is sealed all around so that the gas under pressure held in the container above the liquid cannot enter the casing 14.

The valve block 5 has a square face 23 against which rests a valve head 24 pressed against the seat by a compression spring 25 which maintains the valve closed even when the gas pressure in the vessel falls so low that it cannot hold the valve in engagement with the seat 23 against the weight of the valve.

A stem 26 extends from the valve 24, slidably fitted in a bore in the valve block 5. The outer end of the valve stem extends beyond the valve block 5 and is threaded at 27 for a manipulator nut 30 which can be manually rotated for locking or releasing the valve. The stem has a bore 31 inside extending to the outer end of the stem at one end and terminating at the level of the surface of the valve head 24. A hole 32 extends from the end of the bore 31 to the outside of the stem 26 where it communicates with an annular chamber 33 in the valve block 5. Thus, regardless of the position of the valve, its bore 31 will be in communication with the chamber 20 as soon as the valve is lowered into the chamber.

Normally, the valve is drawn tight against the seat 23 by the manipulator nut 30. By turning the manipulator on the threaded stem 27 in a direction for unscrewing the same, the valve stem is released, making it possible to open the valve by pressing on the manipulator for admitting the liquid into the bore 31.

For spraying the liquid in the form of a fine mist, a nozzle 35 is threaded on the end of the stem 27 provided with a fine spraying hole 36. An elastic washer 37 is placed between the end of the stem 27 and the hole 36 for preventing the liquid from escaping into the threads in the nozzle.

To provide for a tight seal between the block 5 and the wall of the casing 14, and between the block 5 and the stem 26, the block is provided with annular grooves 38, 39 of a triangular shape, forming tapering flanges or hydraulic lips 40, 41 with sharp points. The liquid under pressure in the casing 14, by entering the annular slots 38, 39, causes the flanges 40, 41 to expand outwards, pressing against the inner wall of the casing 14 at the periphery of the block 5, and against the outer surface of the valve stem 26 at the inner surface of the block, thus effectively sealing the clearances between the block and the casing and the stem. The sealing hydraulic lips 41 are raised substantially above the annular chamber 33 so as to provide a free passage for the liquid from the valve chamber into the bore 31.

A special arrangement is provided for maintaining a supply of the liquid at the valve up to the moment when the liquid in the vessel is nearly exhausted, and to prevent in the meantime the escape of the compressed gas in the vessel which provides the force for moving the liquid out of the vessel. This is accomplished in my device by providing a pipe 21 extending from the bottom of the vessel into a corresponding opening in the bottom 45 of the casing 14. The upper end of the pipe is flared out at 46 so that the pipe can be inserted into the casing from the top, before the casing is assembled with the block. The lower portion of the pipe is curved as shown, so as to bring the end of the pipe into a depression at the peripheral portion of the bottom, which is the lowest point of the vessel, the bottom being of a convex shape in the central portion. Since the bottles may not have exactly the same depth, and since the lower end of the pipe must rest at the bottom for collecting the last drops of the liquid, the upper end of the pipe is made to slide in the opening in the bottom of the casing and is held under pressure from a disc 47 of a metal mesh or screen. The edges of the disc are pressed against the bottom 45 by the lower end of the spring 25.

The vessel is filled with the liquid to a certain height, leaving enough space at the top for a compressed air or gas; then the valve casing with the valve is placed in the vessel and secured by the threaded metal cap 11. The nozzle 35 is removed from the end of the stem 27, and a suitable nipple at the end of a hose supplying the compressed air or gas is screwed on the end 27, for filling the space in the vessel above the liquid with an elastic fluid compressed to a desired degree. The manipulator nut 30 must be, of course, unscrewed for this operation to release the valve stem. The valve head will be then forced open by the gas pressure. Upon completion of this operation, the manipulator nut is tightened for locking the valve head in the closed position, after which the washer 37 and nozzle 35 are returned to the stem.

For certain purposes it is desirable to fill the vessel with a mixture of chilled gases which at normal temperature become gasified unless maintained at a sufficiently high pressure. The liquid then will remain as such in the container under pressure of the gases evolved therefrom, and will immediately become gasified upon release into the air.

A modified valve mechanism is shown in Figs. 3, 4 and 5. A manipulator disc 50 is rotatively mounted on an extension 51 of the valve stem 52 and is prevented from axial movement by a shoulder 53 on the stem 52 at one side, and by the nozzle 35 pressed at 54 on the extension 51 of the valve, at the other side. The under side of the manipulator disc 50 is provided with two pads 57, 57 with depressions 58, corresponding to two projections 55, 55, extending from the metal screw cap 56 clamping the valve assembly in its place in the neck and similar to the cap 11 of Fig. 1. When the pads 57 are placed on the projections 55, as shown in Fig. 3, the valve head 24 is drawn tightly against the valve seat 23, the valve being closed. For opening the valve, the manipulator disc 50 is rotated in either direction until the projections 55 leave the pads 57, thereby releasing the valve head from engagement with the seat 23. The valve can be then manually opened by depressing the manipulator 50.

The bottle is provided with a jacket or cover 60 made of a plastic composition and shrunk on the bottle, protecting the latter against breakage. The cover extends over the top of the screw cap 56 up to the projections 55.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A valve for a vessel containing a fluid under pressure comprising a casing; means to support the casing in the vessel, the casing having an opening in communication with the vessel; a valve block supported in the casing having a central bore and a valve seat at the inner side of the block around the bore; a valve head engaging the seat; a stem extending from the valve head slidably fitted in the bore and passing to the outside of the block, the valve stem having a bore extending from the outer end of the stem to the valve head, the valve stem having a duct under the head extending from the bore in the stem to the outer surface of the stem for establishing communication between the bore in the stem and the casing when the valve stem is moved in a direction for moving the valve head away from the valve block; and means on the valve stem to manually move the stem for opening or closing the valve, the block being made of an elastic material and having undercuts at the periphery and around the stem, the undercuts forming flexible cylindrical flanges adapted to be pressed against the inner wall of the casing and against the outer surface of the stem respectively by the pressure of the liquid in the casing, thereby effectively sealing the block against the casing and against the stem.

2. A valve for a vessel containing a liquid under pressure of a compressed gas, comprising a tubular casing having an open outer end and a substantially closed inner end; a flange at the outer end of the casing resting against the outer end of the vessel; a cap clamping the flange against the vessel end; a pipe extending from an opening in the closed end of the casing to the bottom of the vessel; a valve block in the casing having a valve seat at the inner side and a central bore; a flange on the valve block extending over the end of the vessel under the cap, the block being shorter than the casing, thereby forming a chamber in the casing under the block adapted to be filled with the liquid through the pipe under pressure of the gas in the vessel; a valve head engaging the valve seat; a stem extending from the valve head and slidably fitted in the valve block bore, the end portion of the stem extending to the outside of the valve block, the stem having a duct extending from the bore in the stem to the outer surface of the stem under the head; and means on the outer end of the valve stem for co-operating with the valve block for tightening the valve head against the valve seat and for releasing the valve stem, for manually opening the valve.

3. A valve for a vessel containing a liquid under pressure of a compressed gas, comprising a tubular casing having an open outer end and a substantially closed inner end; a flange at the outer end of the casing resting against the outer end of the vessel; a cap clamping the flange against the vessel end; a pipe extending from an opening in the closed end of the casing to the bottom of the vessel; a valve block in the casing having a valve seat at the inner side and a central bore; a flange on the valve block extending over the end of the vessel under the cap, the block being shorter than the casing, thereby forming a chamber in the casing under the block adapted to be filled with the liquid through the pipe under pressure of the gas in the vessel; a valve head engaging the valve seat; a stem extending from the valve head and slidably fitted in the valve block bore, the end portion of the stem extending to the outside of the valve block, the stem having a duct extending from the bore in the stem to the outer surface of the stem under the head, the outer end of the valve stem being threaded; and a manipulator nut on the threaded end of the stem for drawing the stem upwards by screwing the manipulator nut on the valve stem, thereby pressing the valve head against the valve seat, and for releasing the valve stem for manually opening the valve by unscrewing the manipulator nut.

4. A valve for a vessel containing a liquid under pressure of a compressed gas, comprising a tubular casing having an open outer end and a substantially closed inner end; a flange at the outer end of the casing resting against the outer end of the vessel; a cap clamping the flange against the vessel end; a pipe extending from an opening in the closed end of the casing to the bottom of the vessel; a valve block in the casing having a valve seat at the inner side and a central bore; a flange on the valve block extending over the end of the vessel under the cap, the block being shorter than the casing, thereby forming a chamber in the casing under the block adapted to be filled with the liquid through the pipe under pressure of the gas in the vessel; a valve head engaging the valve seat; a stem extending from the valve head and slidably fitted in the valve block bore, the end portion of the stem extending to the outside of the valve block, the stem having a duct extending from the bore in the stem to the outer surface of the stem under the head; and a manipulator rotatively mounted on the stem co-operating with the valve block and having tapering portions for causing the valve stem to be moved upwards by turning the manipulator into valve-closing position for releasing the valve stem and manually opening the valve when the manipulator is turned in the valve-opening position.

5. A valve for a vessel containing a liquid under pressure of a compressed gas, comprising a tubular casing having an open outer end and a substantially closed inner end; a flange of the outer end of the casing resting against the outer end of the vessel; a cap clamping the flange against the vessel end; a pipe extending from an opening in the closed end of the casing to the bottom of the vessel; a valve block in the casing having a valve seat at the inner side and a central bore; a flange on the valve block extending over the end of the vessel under the cap, the block being shorter than the casing, thereby forming a chamber in the casing under the block adapted to be filled with the liquid through the pipe under pressure of the gas in the vessel; a valve head engaging the valve seat; a stem extending from the valve head and slidably fitted in the valve block bore, the end portion of the stem extending to the outside of the valve block, the stem having a duct extending from the bore in the stem to the outer surface of the stem under the head; a cover carried by said valve block; and a manipulator rotatively mounted on the stem, provided with tapering surfaces on its undersurface; projections extending from the outer portion of the valve block cover engaged by the tapering surfaces of the manipulator for drawing the valve stem upwards and closing the valve in one position of the manipulator, and for releasing the stem for manually opening the valve by turning the manipulator in the valve-opening position; and means to prevent axial movement of the manipulator on the stem.

6. A valve as set forth in claim 5, in which a detent is provided in the manipulator for yieldably retaining the valve in the released position.

7. A valve for a vessel adapted to contain fluids under pressure, comprising a tubular casing substantially closed at the bottom and having an outward extending flange at the top engaging the edge portion of the vessel; a cylindrical valve block fitted in the upper portion of the casing having a flange at the top extending over the flange of the casing, the block having a valve seat at the lower end thereof and a bore extending from the valve seat to the upper end of the block; means to press the flanges against the edge of the vessel; a valve head engaging the valve seat; a stem extending from the valve head slidably fitted in the bore, the stem having a central bore extending from the outer end of the stem to the head and having a duct extending from the bore in the stem to the outside of the stem; and rotatable means on the stem adapted to exert pressure against the block while in a valve closing position to manually open or close the valve.

8. A valve for a vessel adapted to contain fluids under pressure, comprising a tubular casing substantially closed at the bottom and having an outward extending flange at the top engaging the edge portion of the vessel; a cylindrical valve block fitted in the upper portion of the casing having a flange at the top extending over the flange of the casing, the block having a valve seat at the lower end thereof and a bore extending from the valve seat to the upper end of the block, the upper, outer side of the vessel having threads; a cap having internal threads engaging the vessel threads and having an inward extending flange engaging the casing and block flanges; a valve head engaging the seat; a hollow stem extending from the head to the outside of the block, the stem having a duct extending from the hollow space in the stem to the outside under the head;

and a rotatable manipulator on the stem for opening and closing the valve.

ANTHONY R. DEY.

REFERENCES CITED

The following references are of record in the file of this patent:

UNITED STATES PATENTS

| Number | Name | Date |
|---|---|---|
| 711,458 | Bastian | Oct. 21, 1902 |
| 1,018,193 | Hinkle | Feb. 20, 1912 |
| 1,274,915 | McEnery | Aug. 6, 1918 |
| 1,742,605 | Lemoine | Jan. 7, 1930 |
| 1,832,570 | Montgomery | Nov. 17, 1931 |
| 1,941,898 | Iddings | Jan. 2, 1934 |

FOREIGN PATENTS

| Number | Country | Date |
|---|---|---|
| 511,501 | Germany | Oct. 30, 1930 |
| 366,626 | Great Britain | Feb. 11, 1932 |
| 413,220 | Great Britain | July 12, 1934 |
| 598,068 | Germany | Mar. 25, 1936 |